Jan. 31, 1939.  J. MORLEY  2,145,313
SAFETYPIN
Filed March 29, 1937
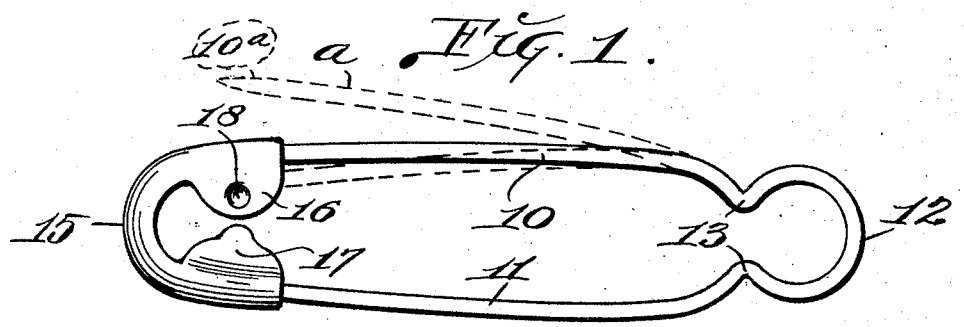
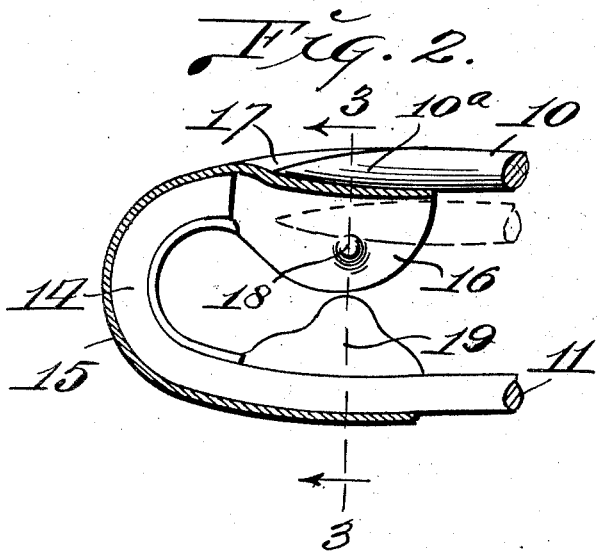
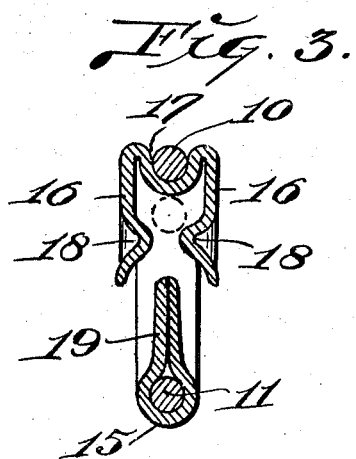
INVENTOR,
JOSEPH MORLEY.
BY Martin P. Smith ATTY.

Patented Jan. 31, 1939

2,145,313

UNITED STATES PATENT OFFICE 2,145,313

SAFETYPIN

Joseph Morley, Los Angeles, Calif., assignor of one-fourth to Fred J. McKane, Los Angeles, Calif.

Application March 29, 1937, Serial No. 133,575

1 Claim. (Cl. 24—156)

My invention relates to a safety pin and has for its principal object the provision of a safety pin wherein the pointed end of the pin occupies a protected position in a recess that is formed in the sheet metal keeper that is positioned on the opposite end of the pin while said pin is not in use, and said pointed end being positioned within the sheet metal keeper while the pin is in use.

In the ordinary safety pins the pointed end of the pin is exposed while the pin is not in use, thus presenting a sharp point which often scratches or punctures the hand or fingers while the pin is being manipulated and applied for use.

Safety pins are largely used in fastening the clothing of infants and there have been cases where safety pins used in the clothing have been detached by infants and swallowed, thereby endangering the life of the infants and in some cases necessitating operations for the removal of the opened pins. Due to the fact that the pointed ends of the opened pins are exposed, it is an extremely difficult matter to extract a pin from the throat or esophagus, and it is one of the purposes of my invention to provide an improved form of pin wherein the pointed end thereof is practically covered and protected while the pin is in both open and closed positions, thus eliminating the danger of possible injury to the hands and fingers while manipulating the pin and also the dangers attending the swallowing of a pin by a child or infant.

With the foregoing and other objects in view, my invention consists of certain novel features of construction and arrangement of parts that will be hereinafter more fully described and claimed and illustrated in the accompanying drawing, in which:

Fig. 1 is a side elevational view of a safety pin constructed in accordance with my invention.

Fig. 2 is an enlarged vertical section of the end of the pin that carries the keeper for the pointed end of the pin.

Fig. 3 is a vertical section taken on the line 3—3 of Fig. 2.

Referring by numerals to the accompanying drawing which illustrates a preferred embodiment of my invention, 10 and 11 designate respectively the substantially parallel legs that form the main body of the pin, and said legs being connected at one end by a yoke 12, and said legs and yoke are formed from a single piece of wire having a certain degree of resilience. The free end of leg 10 is pointed as designated by 10a, in order that said leg may be readily inserted into and through fabric and the like. The wire forming the legs and yoke are bent inwardly at the points where said legs join said yoke, thus forming inwardly presented portions 13 which increase or add to the normal tension of the yoke 12 and the projection 13 between the pointed leg 10 and the yoke functions to a certain extent as a stop to limit the movement of the pointed leg of the pin into the clothing or fabric to which the pin is applied.

The free end of leg 11 is bent upwardly and inwardly to form a substantially semi-circular hook 14, the end of which is spaced a slight distance apart from the pointed end of leg 10, and suitably secured to this hook portion 14 is a keeper 15 formed of thin sheet metal. Portions of this sheet metal project from that portion that is clamped around hook 14 and said portions are bent to form substantially parallel spaced walls 16, and the metal between the upper portions of said walls is bent downwardly to form a short longitudinally disposed groove or channel 17. This groove or channel receives the pointed end 13 of leg 10 when the pin is open or not in use as shown by solid lines in Figs. 2 and 3, and when the pin is applied to fabric or clothing, the pointed end of leg 10 occupies a position between the walls 16 below the groove or channel 17 as shown by dotted lines in Figs. 2 and 3.

The tension of yoke 12 and the inwardly presented points 13 is such that the leg 10 of the pin normally occupies a position so that its pointed end rests in the groove or channel 17 and in order to enable the pointed leg 10 of the pin to be inserted into clothing or fabric, said pointed leg must be pressed or moved outwardly to the position shown by dotted lines A in Fig. 1 so as to separate the pointed end 13 from the keeper.

Portions of the parallel walls 16, below the groove or channel 17, are presented inwardly to form inwardly presented studs 18 and the distance between the ends of these studs is slightly less than the diameter of the wire forming the legs 10 and 11.

Portions 19 of the sheet metal forming the keeper 15 on the end that is clamped around the leg 11 are pressed together to form a centrally arranged wall that projects upwardly toward the parallel walls 16, thus forming a guide for the pointed end of leg 10 when the same is positioned between the walls 16.

To secure the pointed end of leg 10 in the keeper, after said leg has been inserted through fabric or clothing, the pointed end 13 of said leg is pressed toward the leg 11 outside one of the walls 16 until said pointed end passes beneath the wall and such action creates tension in leg 10 and yoke 12, and which tension tends to move the pointed end of leg 10 upwardly between the walls 16 or toward its normal position. In order to position the pointed end of leg 10 directly beneath the groove or channel 17, it is necessary for the person manipulating the pin to exert slight upward pressure against the pointed end of the pin in order to cause the same to pass between the inner ends of the studs or projections 18, thus the tension created in leg 10 tends to press the pointed end of said leg upwardly against the sheet metal of the keeper directly below the groove or channel 17, and in order to disengage the pointed end of the leg 10 from the keeper, it is necessary to apply sufficient pressure to said pointed end to cause the same to pass beneath the projections 18 and then downwardly between the upper end of the wall 19 and the lower edge of one of the walls 16.

Thus it will be seen that I have provided a safety pin that is relatively simple in construction, inexpensive of manufacture and very effective in performing the functions for which it is intended.

The especially desirable feature of my invention is the construction whereby the pointed end of the pin is practically covered and protected while the pin is not in use or disengaged from clothing or fabric and as a result the danger of scratching or puncturing the hands or fingers is eliminated, and in the event that the pin should be swallowed by a child or infant it cannot become lodged in the esophagus and as a result the pin may readily be removed without the necessity of an operation.

It will be understood that minor changes in the size, form and construction of the various parts of my improved safety pin may be made and substituted for those herein shown and described without departing from the spirit of my invention, the scope of which is set forth in the appended claim.

I claim as my invention:

In a safety pin, the combination with a pair of substantially parallel legs formed of resilient wire, which legs are connected at one end and the free end of one of said legs being pointed and the free end of the other leg being rebent toward the pointed end of the first mentioned leg, of a keeper secured to the rebent end of the leg, a pair of spaced parallel walls projecting from the upper portion of the keeper that engages the rebent end of the leg, there being a longitudinally disposed groove formed in the wall of the keeper between said spaced parallel walls in which the pointed end of the leg is normally seated, the parallel walls below the longitudinally disposed groove being indented inwardly to retain the pointed end of the leg in position between the parallel walls and the end portions of the metal of the keeper that is applied to the rebent end of the leg projecting in parallel arrangement toward the space between the indented parallel walls with the ends of said parallel projecting walls being spaced apart from the edges of the indented walls.

JOSEPH MORLEY.